United States Patent
Snyder

[15] 3,689,868
[45] Sept. 5, 1972

[54] CORD STORING FACE PLATE

[72] Inventor: Ernest L. Snyder, Boulder, Colo.

[73] Assignee: DTM Products, Incorporated, Boulder, Colo.

[22] Filed: Nov. 20, 1970

[21] Appl. No.: 91,310

[52] U.S. Cl..............339/119 C, 191/12.4, 242/73, 242/85.1, 339/147 C
[51] Int. Cl. ..............................................H01r 13/60
[58] Field of Search...339/147 C, 123, 119 R, 119 C, 339/5, 36, 75 R, 75 P, 126 R, 125 R; 191/12, 12.2, 12.4; 242/85.1, 71.9, 73; 174/66, 67

[56] References Cited

UNITED STATES PATENTS

| 3,013,105 | 12/1961 | Craig | 339/147 C X |
| 2,070,561 | 2/1937 | Cantor | 191/12.4 |
| 2,470,320 | 5/1949 | Page | 339/147 C X |
| 3,290,453 | 12/1966 | Jensen | 242/85.1 |

FOREIGN PATENTS OR APPLICATIONS

| 230,305 | 3/1944 | Switzerland | 242/85.1 |
| 802,442 | 12/1968 | Canada | 339/119 C |

Primary Examiner—Marvin A. Champion
Assistant Examiner—Terrell P. Lewis
Attorney—Robert E. Isner and Peter J. Franco

[57] ABSTRACT

A cord storing face plate is provided for use with an electrical outlet. The face plate has a cover plate and a facing plate which is adapted to be mounted to the cover plate and to form a spool therebetween around which electrical cord can be wound and stored. The size of the spool can be varied as desired. While the stored cord can be quickly released by disengaging the facing plate from the cover plate, accidental release cannot occur since the facing plate and cover plate cannot be pulled apart.

12 Claims, 7 Drawing Figures

PATENTED SEP 5 1972  3,689,868

INVENTOR.
ERNEST L. SNYDER

BY

ATTORNEYS

INVENTOR.
ERNEST L. SNYDER

BY

ATTORNEYS

CORD STORING FACE PLATE

The present invention relates to wall or cover plates for use with electrical outlets and more particularly to cover plates which can store the unused portions of electrical appliance cord.

When an electrical appliance such as a lamp or a radio is plugged into an electrical outlet the length of the cord provided is often longer than that which is required. It is desirable to minimize or eliminate this cord surplusage so that a neatly appearing cord will be assured.

This invention may be briefly described as a cover plate to which a facing plate is mounted. The appliance cord passes between the facing plate and the cover plate and is wound about a spool which is situated intermediate the two plates. The size of the storage space can be varied as desired. When the second plate is mounted to the cover plate it is locked in position so that the two plates will not be inadvertently pulled apart during use.

Among the advantages of the subject invention is the provision of a face plate which has a spool onto which excess cord may be wound for storage thereof and released simply by disengaging the facing plate from the cover plate.

Accordingly the principle object of the present invention is the provision of a face plate in which appliance cord can be easily stored and quickly released.

Another object of the present invention is the provision of a face plate in which stored appliance cord cannot be accidentally released.

A further object of the present invention is the provision of a face plate which has adjustable storage space to accommodate the storage of different lengths of appliance cord.

Other objects and advantages of the subject invention will become apparent from the following portion of this specification and from the accompanying drawings which illustrate, in accord with the mandate of the patent statutes presently preferred embodiments incorporating the principles of the invention.

Referring to the drawings.

Figure 1:
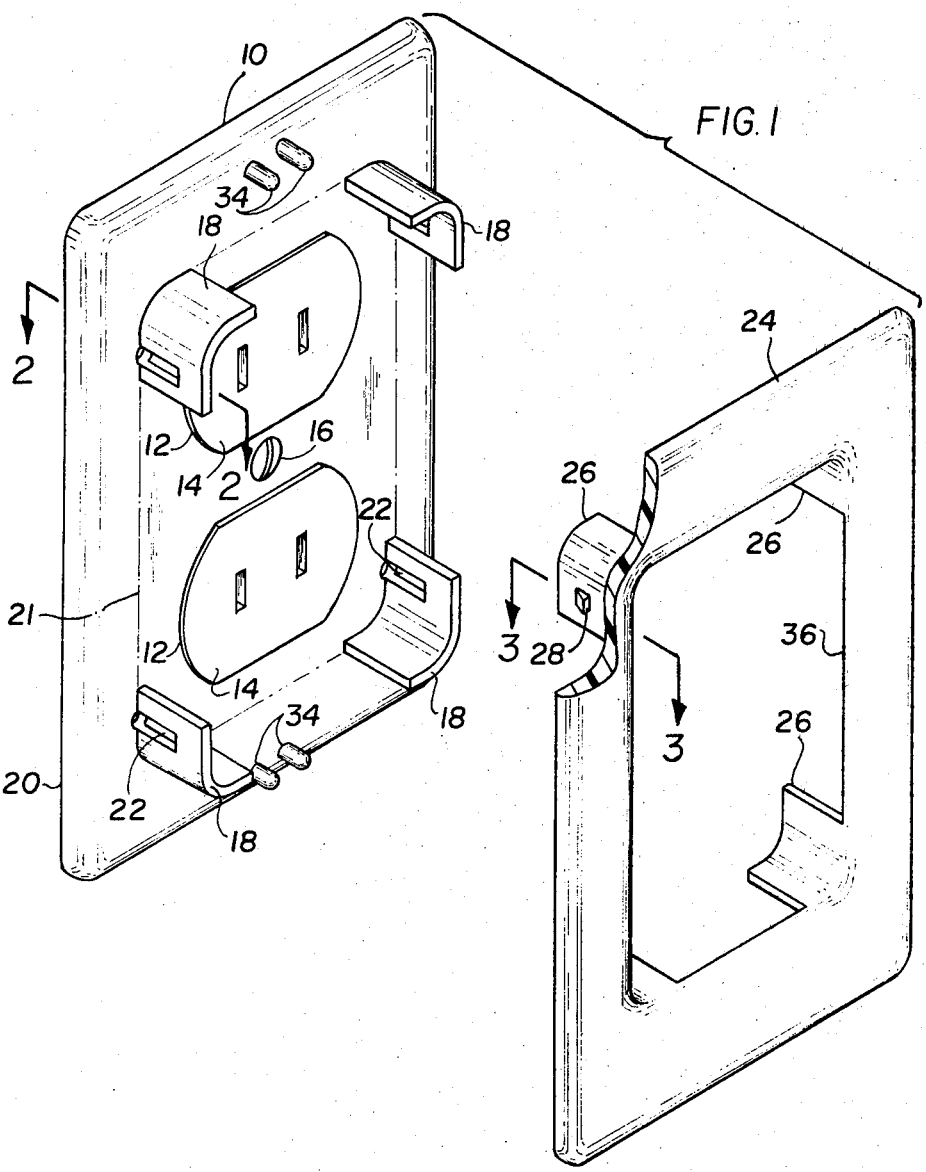
FIG. 1 is a perspective view of a first preferred embodiment of the face plate of this invention with the parts thereof separated.
Figures 2, 3:
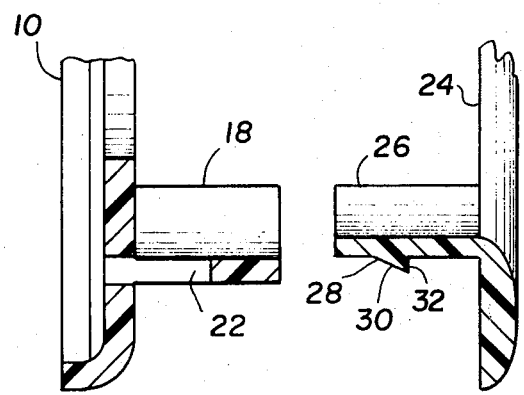
FIG. 2 is a sectional view of the face plate as constituted at the line 2—2 of FIG. 1.
FIG. 3 is a sectional view of the face plate as constituted at the line 3—3 of FIG. 1.

Referring to the drawings and particularly to FIGS. 1 through 4, a two piece cord storing face plate is provided. A first piece 10 which corresponds to a conventional wall or cover plate is made of a resilient plastic and has a pair of openings 12. These openings receive the projecting sockets 14 of an electrical outlet when the cover plate is secured to the outlet by a central screw 16 which passes through a cover plate aperture. Extending perpendicularly from the front of the cover plate 10 are four posts 18. These posts are set in from the outer periphery 20 of the cover plate 10 and define with the outer periphery an annular peripheral area. The inner periphery of this annular area is completed in FIG. 1 with a broken line 21. Each post 18 has a slot 22 which, as can be seen in FIG. 2, terminates abruptly a predetermined distance from the top of the post. While these slots 22 begin at the base of the posts, this is not necessary as will subsequently become apparent.

The second piece of the cord storing face plate, also made from a resilient plastic, is a facing plate 24 which has four posts 26 which extend outwardly from the back face thereof and which are designed to mate with the four posts 18 of the cover plate 10. Each post 26 has a projecting element 28 which is located on the surface of the post which is to engage the corresponding cover plate post 18. The projecting elements, as illustrated in FIG. 3 have a first surface 30 which is inclined outwardly toward the facing plate. These inclined surfaces enable the projecting elements to easily pass the tops of the cover plate posts when the cord storing face plate is assembled allowing the complete mating of the four post pairs. The projecting elements 28 are so located on the facing plate posts 26 that they will overlie the top portions of the slots 22 when there is a predetermined separation between the cover and facing plates. The projection elements as they pass along the cover plate posts effect a separation between the mating post pairs creating a force which urges the projecting elements 28 into the corresponding cover plate slots 22 when these elements become positioned thereover. When these projection elements are forced into the cover plate post slots the tops of the cover and facing plate posts lie adjacent the facing and cover plates respectively whereby the facing plate will be mounted to the cover plate with the predetermined separation therebetween.

The facing plate posts are set in from the outer periphery of the facing plate 24 and define with this outer periphery a second annular area. When the facing plate is mounted to the cover plate a spool is established which is defined by the mating posts and the annular peripheral areas of the cover and facing plates.

When cord is wound about the spool the cover plate 10 and facing plate 24 are urged apart. This force is supplimented whenever the cord is tugged on or otherwise pulled. To prevent the facing plate and cover plate from being accidentally pulled part thereby releasing the stored appliance cord, the projecting elements 28 have a second surface 32 which extends perpendicularly outwardly from the surface of the post to form with the first surface wedge shaped projecting elements. When the projecting elements are urged into their respective slots their perpendicularly extending surfaces 32 mate with the top end surfaces of the cover plate post slots and this abutting relationship prevents the pulling apart of the cover and facing plates.

When it is desired to disengage the cover plate from the facing plate the facing plate is pushed across the cover plate from one side to the other. Since the facing plate posts lie interiorly of the cover plate posts the cover plate posts on the other side resist this displacement and distort the mating posts on this side as well as being distorted themselves increasing the distance between the cover plate posts on the one side and the cover plate posts on the other and decreasing the distance between the facing plate posts on the one side and the facing plate posts on the other. This effects a separation between the mating posts on the one side thereby freeing the projecting elements from the slots allowing the two plates to be taken apart.

The cover plate is first screwed into position over the receptacle and the plug or plugs are inserted into the electrical sockets. The cord of the electrical appliance is then passed between two of the cover plate posts, the facing plate is mounted of the cover plate and any excess cord is wound around the spool.

Figure 5:
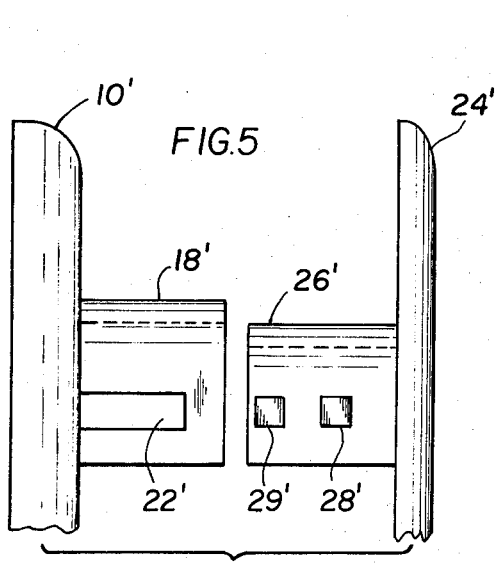
FIG. 5 is an elevational view of a fragment of a second preferred embodiment of the face plate of this invention with the parts thereof separated.
Figure 6:
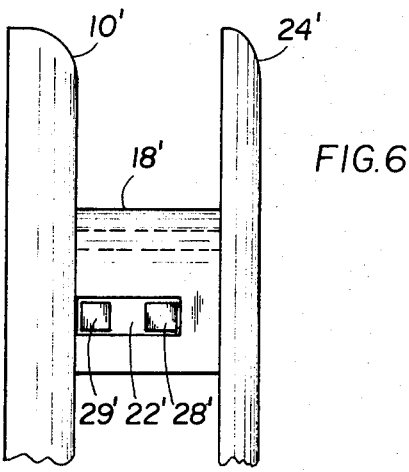
FIG. 6 is a view similar to that of FIG. 5 with the parts of the face plate joined together with a minimum separation therebetween.
Figure 7:
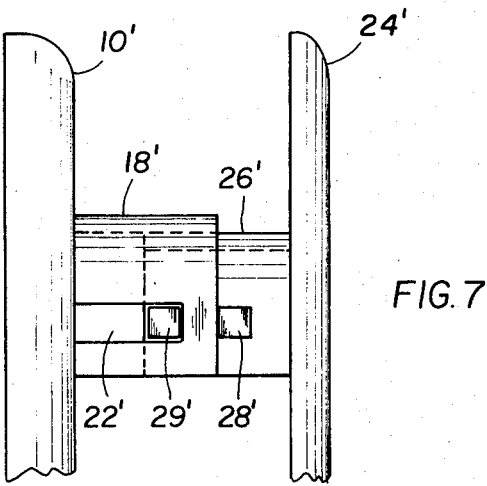
FIG. 7 is a view similar to that of FIG. 6 with the parts of the face plate joined together with a greater separation therebetween.

When the spool provided in the cord storing face plate illustrated in FIGS. 1 to 4 is not large enough to store the excess cord of the one or two plugs plugged into the electrical sockets, a second preferred embodiment of the invention can be utilized. The second preferred embodiment is identical to the first embodiment with the exception of the feature illustrated in FIGS. 5, 6 and 7 and described below.

In this second cord storing face plate the slots 22' have been lengthened and an additional projecting element 29', identical to the above described projecting elements, has been added to each of the facing plate posts. The height of the posts is the same as that for the cord storing face plate illustrated in FIGS. 1 – 4. When the outermost projection elements 28' are positioned within the cover plate post slots 22' this cord storing face plate functions identically to the face plate illustrated in FIGS. 1 – 4. However, to make the spool larger, where desired, the cover 10' and facing 24' plates can be separated until the innermost projection elements 29' overlie the top portions of the slots and are resiliently urged thereinto. The blind end of each of the slots 22' is positioned intermediate each pair of projecting elements 28', 29' whereby the facing plate is mounted to the cover plate with an increased separation therebetween increasing the storage capacity of the spool.

Figure 4:
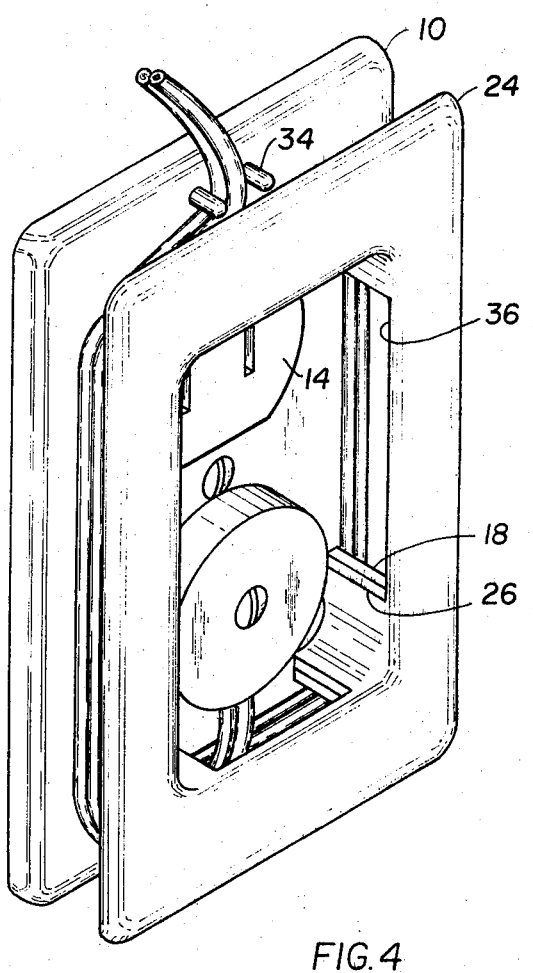
FIG. 4 is a perspective view of the assembled face plate having the first preferred embodiment.

On the top and bottom of the cover plate front surface may be located pairs of outwardly extending nip pins 34 (FIGS. 1 and 4). After the cord has been wound about the spool it can be pinched into one pair of these nip pins. This prevents the unwinding of the spool.

While the face plate as illustrated has an aperture 36 therein such aperture is only necessary when larger plugs are being used. When small or flattened plugs are used or when it is simply desired to completely close off an electrical outlet a face plate having no aperture therein could be mounted to the cover plate.

Additionally while in the preferred embodiment both plates are identically sized and shaped they may have any size and shape so long as a spool is established therebetween around which cord can be wound and stored.

Having thus described my invention, I claim:

1. A cord storing face plate for use with an electrical outlet including outwardly projecting sockets comprising cover plate means including central opening means therein for receiving the projecting sockets of the electrical outlet and a plurality of posts extending outwardly from the front surface thereof, said posts being inset from the outer periphery of said cover plate means and defining an annular peripheral area therewith, and second plate means including a plurality of posts extending outwardly from the back surface thereof for mating with said plurality of cover plate means posts, said second plate means posts being inset from the outer periphery of said second plate means and defining an annular peripheral area therewith, said mating posts including means for mounting said second plate means to said cover plate means with a predetermined separation therebetween whereby said cover plate means, second plate means and mating posts establish a spool around which cord can be wound and stored.

2. A cord storing face plate according to claim 1, wherein said mounting means further comprises means for preventing the pulling apart of said cover plate means and second plate means when said second plate means is mounted to said cover plate means with said separation therebetween.

3. A cord storing face plate according to claim 1 wherein said cover plate means posts and said second plate means posts are resilient, said cover plate means posts have slot means therein extending upwardly toward but terminating short of the tops thereof, said second plate means posts include projection means selectively sized and located so that when said cover plate means and said second plate means have said separation therebetween said projection means will overly the top portions of said slot means and be resiliently urged thereinto for mounting said second plate means to said cover plate with said separation therebetween, and said projection means include means for abutting the top portions of said slot means when said projection means are positioned within said slot means whereby the pulling apart of said cover plate means and said second plate means will be prevented.

4. A cord storing face plate according to claim 3, wherein said projection means are wedges having a first surface inclined outwardly toward said second plate means and a second surface extending perpendicularly from said second plate means posts, said perpendicularly extending surfaces comprising said abutting means.

5. A cord storing face plate according to claim 4, wherein said slot means include top surfaces for mating with said perpendicularly extending surfaces when said second plate means is mounted to said cover plate means with said predetermined separation therebetween.

6. A cord storing face plate according to claim 1, wherein said cover plate means further comprises a plurality of nip pin pairs, extending upwardly from the front surface thereof into which the cord can be forced and therein held whereby the unwinding of stored cord will be prevented.

7. A cord storing face plate according to claim 1 wherein said mating posts further include means for mounting said second plate means to said cover plate means with a second separation therebetween and means for preventing the pulling apart of said cover plate means and said second plate means when said second plate means is mounted to said cover plate means with said second separation therebetween.

8. A cord storing face plate according to claim 7, wherein said second plate means posts include second projection means selectively sized and located so that when said cover plate means and second plate means have said second separation therebetween said second projection means will overly the top portions of said slot means and be resiliently urged thereinto for mounting said second plate means to said cover plate means, and said second projection means include means for abutting the ends of said slot means when said second projection means are positioned within said slot means whereby the pulling apart of said cover plate means and said second plate means with said second separation therebetween will be prevented.

9. A cord storing face plate according to claim 8 wherein said second projection means are wedges having a first surface inclined outwarding toward said second plate means and a second surface extending perpendicularly from said second plate means posts, said second projection means perpendicularly extending surfaces comprising said means for abutting the ends of said slot means when said second projection means are positioned therein.

10. A cord storing face plate according to claim 3, wherein said cover plate means post slots are situated in parallel planes.

11. A face plate for use with an electrical outlet including outwardly projecting sockets comprising a cover plate including central opening means therein for receiving the projecting sockets of the electrical outlet and a plurality of posts extending outwardly from the front surface thereof, second plate means including a plurality of posts extending outwardly from the back surface thereof for mating with said plurality of cover plate posts said mating posts including means for mounting said second plate means to said cover plate, means for preventing the pulling apart of said cover plate and second plate means when said second plate means is mounted to said cover plate, and said second plate means further including means for preventing the insertion of articles into the electrical outlet sockets.

12. A face plate according to claim 11 wherein said second plate means is imperforate.

* * * * *